(12) United States Patent
Walter

(10) Patent No.: US 8,824,741 B2
(45) Date of Patent: Sep. 2, 2014

(54) METHOD FOR ESTIMATING THE ROLL ANGLE IN A TRAVELLING VEHICLE

(75) Inventor: Michael Walter, Heerbrugg (CH)

(73) Assignee: Conti Temic microelectronic GmbH, Nuremberg (DE)

(*) Notice: Subject to any disclaimer, the term of this patent is extended or adjusted under 35 U.S.C. 154(b) by 275 days.

(21) Appl. No.: 13/511,733

(22) PCT Filed: Nov. 16, 2010

(86) PCT No.: PCT/DE2010/001332
§ 371 (c)(1),
(2), (4) Date: May 24, 2012

(87) PCT Pub. No.: WO2011/063785
PCT Pub. Date: Jun. 3, 2011

(65) Prior Publication Data
US 2012/0281881 A1    Nov. 8, 2012

(30) Foreign Application Priority Data
Nov. 25, 2009 (DE) .......................... 10 2009 055 776

(51) Int. Cl.
*G06K 9/00* (2006.01)
*H04N 7/18* (2006.01)

(52) U.S. Cl.
USPC .......................................... 382/104; 348/148

(58) Field of Classification Search
CPC .............. G06K 9/00; G08G 1/00; B60G 1/00
USPC .................. 382/104, 106; 348/118, 119, 120, 348/211.9, 837; 340/425.5, 441, 901, 903, 340/933, 935, 988, 991, 992, 994; 701/32.5, 45, 527
See application file for complete search history.

(56) References Cited

U.S. PATENT DOCUMENTS 6,285,393 B1 * 9/2001 Shimoura et al. ............. 348/119
6,963,657 B1 * 11/2005 Nishigaki et al. ............. 382/106
(Continued)

FOREIGN PATENT DOCUMENTS

DE       102 04 128       8/2003
DE      102004048400      4/2006
(Continued)

OTHER PUBLICATIONS

International Search Report of the International Searching Authority for International Application PCT/DE2010/001332, mailed Mar. 8, 2011, 3 pages, European Patent Office, HV Rijswijk, Netherlands.

(Continued)

*Primary Examiner* — Abolfazl Tabatabai
(74) *Attorney, Agent, or Firm* — W. F. Fasse

(57) ABSTRACT

The invention relates to a method for estimating the roll angle in a travelling vehicle (7), comprising the following steps. In step a), a camera (8) is used to record a sequence of images of the vehicle's surroundings, in particular of the road (1) ahead. In step b), at least one signature (S1-S6) on the road surface is extracted from the camera images, i.e. said signature is determined and tracked. The changed position of the at least one signature (S1-S6) in one or more subsequent camera image(s) is used in step c) to determine in which direction the camera (8) is turned with regard to the roll angle.
The value of the roll angle is estimated in step d).
For this purpose, the roll angle is either directly estimated in step d1), taking into account the vehicle speed (v) and an imaging model of the camera (8), or the roll angle is iteratively increased or decreased by a defined correction angle in step d2) until the roll angle sufficiently compensates for the turning of the camera (8). On this basis, the estimated roll angle is obtained as an overall correction value.

16 Claims, 3 Drawing Sheets

(56) References Cited

U.S. PATENT DOCUMENTS

Figure 1:
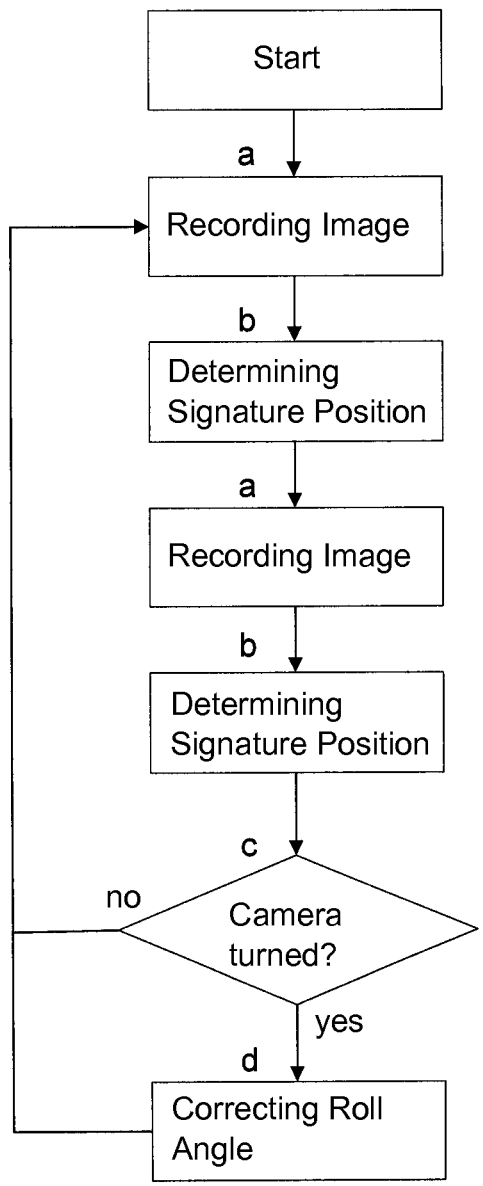

| | | | |
|---|---|---|---|
| 7,260,460 B2* | 8/2007 | Mattes et al. | 701/45 |
| 8,155,798 B2* | 4/2012 | Seiniger et al. | 701/1 |
| 2007/0299596 A1 | 12/2007 | Moritz et al. | |

FOREIGN PATENT DOCUMENTS

| | | |
|---|---|---|
| DE | 102006018978 | 11/2007 |
| EP | 1 783 683 | 5/2007 |
| JP | 2000-353300 | 12/2000 |
| JP | 2003-083742 | 3/2003 |

OTHER PUBLICATIONS

PCT International Preliminary Report on Patentability, including English Translation of PCT Written Opinion of the International Searching Authority for International Application PCT/DE2010/001332, issued May 30, 2012, 7 pages, International Bureau of WIPO, Geneva, Switzerland.

German Search Report for German Application No. 10 2009 055 776.8, dated Feb. 8, 2010, 4 pages, Muenchen, Germany, with English translation, 4 pages.

* cited by examiner

METHOD FOR ESTIMATING THE ROLL ANGLE IN A TRAVELLING VEHICLE

The invention relates to a method for estimating the roll angle in a travelling vehicle by means of a camera and is used e.g. in vehicles that are equipped with driver assistance features.

Driver assistance features include, for example, traffic sign recognition, adaptive light control, vehicle and pedestrian detection, night vision systems, adaptive cruise control (ACC), parking assistance or automatic parking and lane detection.

Lane detection systems require detailed information on the position and angle of installation of the camera in the vehicle to estimate the lane width, lateral deviation from the correct lane position and the yaw angle. To be specific, this includes the height as well as the roll, pitch and yaw angles of the camera, which, as a rule, must be ascertained by means of a complex band end or service calibration procedure.

While lane detection systems are able to estimate the pitch and yaw angles, this requires the roll angle to be known since errors relating to the roll angle will lead to errors in the pitch and yaw angles.

It is a basic problem that, despite careful calibration of the camera's position and angle of installation after installation in a vehicle, there may be a minor error in the roll angle on the one hand, which will then persist, and that subsequent changes of the camera's position and angle of installation or, for example, uneven loading of the vehicle may lead to a deviation of the roll angle on the other.

DE 10 2006 018 978 A1 shows a method for determining the dynamic roll angle by means of a device for determining the yaw rate and the specific roll stiffness of the vehicle.

The object of the present invention is to provide a method for estimating the roll angle that allows an up-to-the-moment and precise estimation of the roll angle in a travelling vehicle.

According to the invention, the aforesaid object is achieved by means of a method according to the independent patent claims. Advantageous further developments are set out in the sub-claims.

A method for estimating the roll angle in a travelling vehicle is provided, which method comprises the following steps. In step a), a camera is used to record a sequence of images of the vehicle's surroundings, in particular of the road ahead. In step b), at least one signature on the road surface is extracted from the camera images, i.e. its shape and position are determined and tracked. A signature is a structure on the road surface, for example the beginning or end of a marking on the road. The changed position of the at least one signature in one or more subsequent camera image(s) is used in step c) to determine in which direction the camera is turned with regard to the roll angle.

The value of the roll angle is estimated in step d).

For this purpose, the roll angle is either directly estimated in step d1), taking into account the vehicle speed (of the own vehicle) and an imaging model of the camera, or the roll angle is iteratively increased or decreased by a correction angle in step d2) until the roll angle compensates for the turning of the camera. For iterative estimation of the roll angle, the roll angle is preferably estimated to be zero at the beginning of the method. During the method, the (currently estimated) roll angle is corrected by a correction angle according to the turning direction determined in step c) until the changed position of the at least one signature in one or more subsequent camera image(s) allows to deduce that the roll angle sufficiently compensates for the turning of the camera. Sufficient compensation can be assumed to be achieved when the corrected roll angle no longer deviates from zero for a certain angle resolution (e.g. deviation of less than 0.1° or 0.5°). On this basis, the absolute estimated roll angle is obtained as an overall correction value, either by multiplying the number of corrections made by the predefined correction angle or, in case of varied correction angle values, by summing up all corrections made.

The advantage of the invention is that the roll angle in the travelling vehicle can be estimated in an up-to-the-moment and precise manner. The method according to the invention does not require a device for yaw rate determination. In trial runs, the method allowed to estimate and compensate for a roll angle deviation of up to seven degrees.

The invention is based on the insight that, in case the roll angle is zero, all pixels that are within a line of an image recorded by the camera and represent the road surface correspond to points located at an identical distance from the camera in the projection along the vehicle's longitudinal direction if expressed in world coordinates. This insight is based on the assumption that the road is essentially flat. This corresponds to a "flat earth geometry" assumption with regard to the road. In this context, the world coordinates are the coordinates in real space, as opposed to the image coordinates that are defined, for example, by lines and columns of the camera image. An imaging model of the camera indicates how points in real space (world coordinates) are shown in the image (image coordinates). Pixels whose image coordinates are known can be projected back, thus obtaining object points in world coordinates, if a complete imaging model of the camera is known. As the signatures can, by definition, be located on the road surface and the road surface is assumed to be flat, a simple back-projection is sufficient to determine the position of a signature in world coordinates. For the purpose of the invention, the interest is mainly on that component of the distance between a point on the road surface and the camera in real space that extends in the vehicle's longitudinal direction.

In case the roll angle is not zero, pixels that are within a line of an image recorded by the camera and represent the road surface correspond to points located at an increasing or decreasing distance in the projection along the vehicle's longitudinal direction if expressed in world coordinates. If, for example, pixels representing the road that are within a line in the image correspond to points located at distances increasing from left to right in real space, the camera is turned to the left with regard to its viewing direction.

To determine the distance of pixels in the projection along the vehicle's longitudinal direction, the lengths of the flow vectors can be analysed, in particular on the basis of the optical flow of the pixels. If, for example, the vertical components of the flow vectors of road points represented by pixels that are within a line in the image increase from left to right, the camera is turned to the right.

In an advantageous further development of the invention, the distance of a signature from the camera in the vehicle's longitudinal direction is determined in step d1), taking into account an imaging model of the camera. For this purpose, a representation in bird's-eye view of the signature(s) determined in the camera image can be obtained, for example, by means of back-projection, and this representation can be used to determine the distance between the signature and the camera in the vehicle's longitudinal direction.

Preferably, the distance of the signature (from the camera in the vehicle's longitudinal direction) that has been determined and the vehicle's speed are used to predict a distance of the signature after a time Δt.

Preferably, a subsequent image that has been recorded at a time Δt after the first image is used to measure the distance of the same signature from the camera in the vehicle's longitudinal direction by means of back-projection.

Preferably, a deviation of the measured distance from the predicted distance is used to estimate the roll angle, taking into account an imaging model of the camera. In this context, it is assumed that the prediction is a distance at a roll angle of zero, and in case of a deviation, the roll angle at which the camera would have measured a distance corresponding to the predicted distance can be directly determined.

In this context, any uncertainty relating to the value of the vehicle's speed may result in consequential errors during roll angle estimation. In a preferred embodiment of the invention, a known error in the sense of a previous measuring uncertainty relating to the vehicle's speed is taken into account during estimation of the roll angle, and the resulting roll angle error is estimated, in particular by means of a Kalman filter.

According to an advantageous further development of the invention, at least one first signature in the left image half and, in the same or a subsequent image, at least one second signature in the right image half are determined and tracked in step b).

In addition, the vehicle's speed at the time each camera image is recorded is stored.

In step c), the currently determined roll angle of the camera is used to make a separate prediction of the signature distance for each signature, taking into account the relevant vehicle speed and the imaging model. The signature distance is measured in a subsequent image in each case. The turning direction of the camera (the roll angle) is determined by comparing the deviation of the predicted signature distance from the measured signature distance for the first signature with the deviation for the signature distance of the second signature.

The roll angle is iteratively estimated according to step d2).

This further development has the advantage that errors relating to the vehicle's speed can be compensated for by comparing the right and left signature deviations. As a result, this method ensures a high degree of precision.

In a preferred embodiment, at least one first signature in the left and, in the same or a subsequent image, a second signature in the right lower image quadrant are determined and tracked in step b). In addition, the vehicle's speed at the time each camera image is recorded is stored.

In step c), the change in vertical signature position in the image is related to the relevant vehicle speed for each of the signatures. The ratio obtained in this way is compared for both image halves, deducing that the camera, i.e. its viewing direction, is turned in the direction of the image half where this ratio is larger.

The roll angle is iteratively estimated according to step d2). This method has the advantage that errors in the vehicle's absolute speed have almost no adverse effect.

The invention also relates to a device for estimating the roll angle in a travelling vehicle by means of a camera and with the aid of means for estimating the roll angle according to the invention.

The invention will hereinafter be explained with reference to exemplary embodiments and figures.

Figure 2:
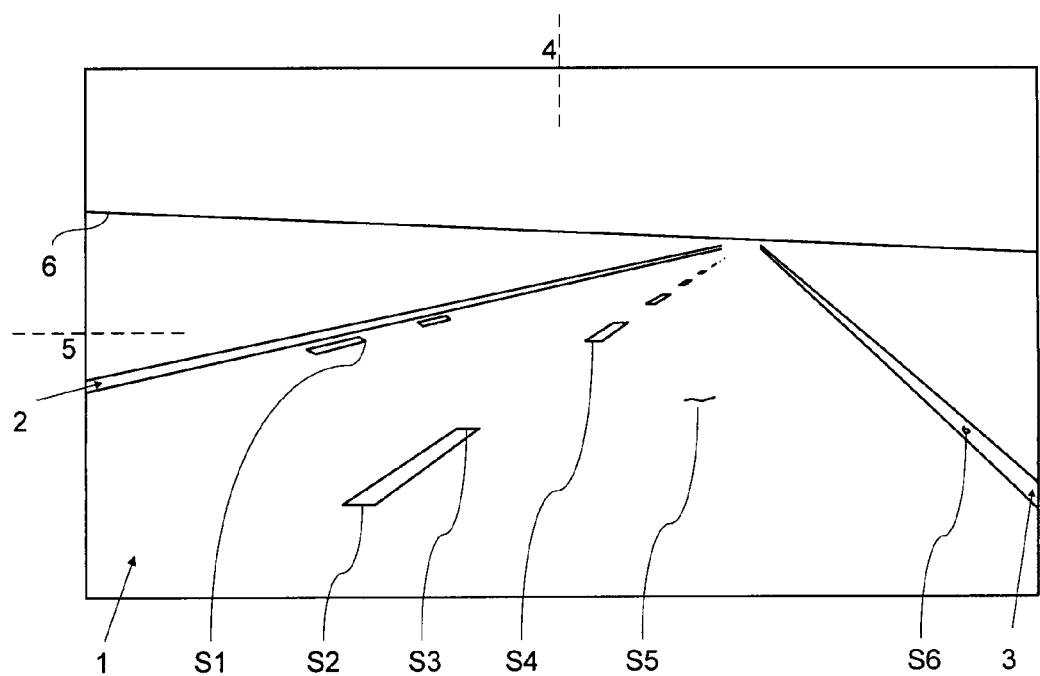
Figure 3:
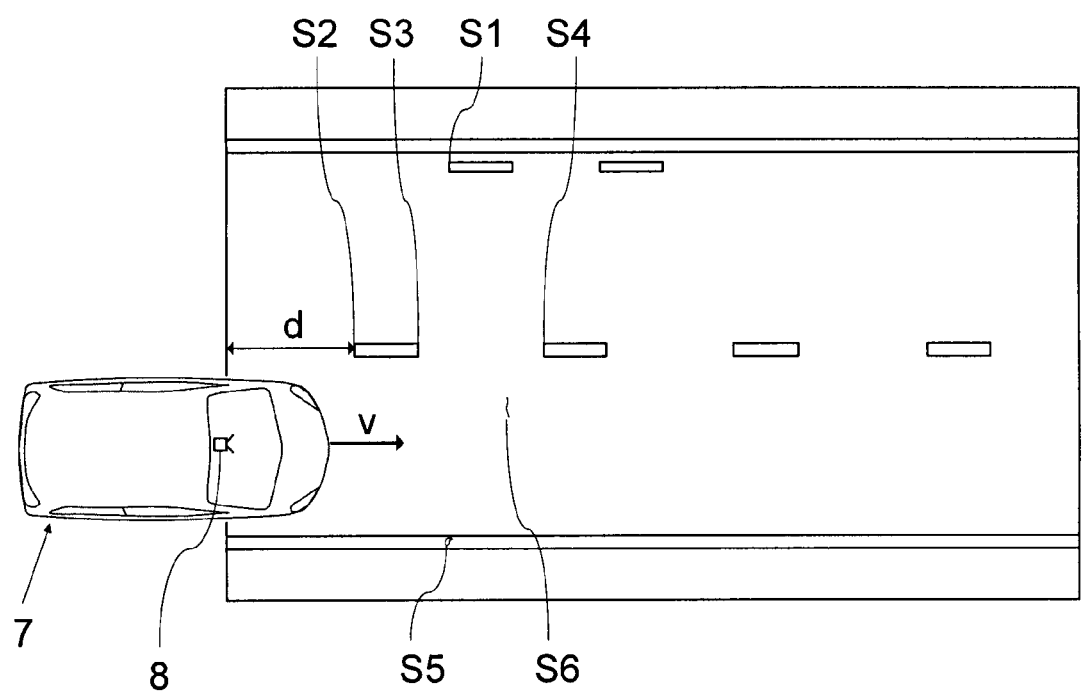

FIG. 1: diagram of a method for estimating the roll angle
FIG. 2: camera image of a road with signatures
FIG. 3: representation of the scene shown by the camera image in bird's-eye view The flow diagram in FIG. 1 shows an exemplary embodiment of a method for estimating the roll angle.

In step a), a camera (8) in a travelling vehicle is used to record an image of the vehicle's surroundings that comprises the road ahead. In step b), the camera image is used to determine at least one signature (S1-S6) on the road surface and to determine the position of said signature in the image. A signature (S1-S6) is a structure on the road surface, for example the beginning (S2, S4) or end (S3) of a marking on the road. In a subsequent step a), another image is recorded, which is used to determine the current position of the signature (S1-S6) in the image. The changed position of the at least one signature (S1-S6) is used in step c) to determine whether and in which direction the camera (8) is turned with regard to the roll angle. If the camera (8) is turned, the roll angle is corrected in step d). The estimation of the roll angle is based on the sum of the corrections made in step d).

FIG. 2 shows an example of a camera image of the vehicle's surroundings, as it is recorded in step a). The vehicle travels on a road (1) that is delimited by a left (2) and a right (3) continuous road marking. The centre of the road (1) is marked by a dashed central line. Numerous signatures can be seen on the road surface. The signatures (S1-S6) are indicated in the figure. The signatures (S1-S6) are detected in step b). The signature (S1) is an additional marking on the left side of the road. The signatures (S2) and (S4) as well as (S3) are the beginnings and end, respectively, of central line markings. The signature (S5) is a crack in the road surface and the signature (S6) is a structure on the right continuous road marking (3), for example dirt or a hole in said marking. The auxiliary lines (4) and (5) indicate the horizontal and vertical centre of the image. The image lines and image columns are parallel to the auxiliary lines (5) and (4). The fact that the horizon (6) is not horizontal suggests to the human viewer that the roll angle at which this image was recorded deviates from zero and the camera (8) is turned to the left.

FIG. 3 shows a representation of the scene shown by the camera image in bird's-eye view.

This representation of the scene shown by the camera image in bird's-eye view (bird view or top down view) with markings and signatures (S1-S6) in world coordinates can be obtained using the image coordinates, e.g. in 5 cm increments, by means of a back-projection that is based on the imaging model of the camera (8), taking into account the currently estimated roll angle.

The signatures (S1-S6) on the road surface are extracted from this representation. They are used to determine the distance (d) of a signature (S1-S6) from the camera (8) in the direction of the vehicle's longitudinal axis.

The position of this signature (S1-S6) in world coordinates is predicted for a later time, taking into account the vehicle's own speed (v). In this context, the later time Δt is selected in such a manner that the camera (8) records a subsequent image at said later time Δt. This means, the later time Δt is a multiple of the reciprocal value of the image frequency later (e.g. 40 ms) than the time t=0 when the first image is recorded (FIG. 2). The image recorded at a later time Δt is not shown.

A prediction at a time Δt for a signature (S1-S6) that is located at a distance d_0 from the camera (8) in world coordinates at the time t=0 is obtained, for example, according to:

$$d\_est = d\_0 - v \cdot \Delta t$$

wherein v is the speed of the vehicle that has been determined at the time t=0.

The corresponding representation of the image recorded at a later time dt is used to measure the real distance (d_meas) of this signature (S1-S6) in world coordinates.

The ratio of the measured to the predicted signature distance is determined: d_meas/d_est.

According to another embodiment, signatures in the left (S1-S3) and right (S4-S6) image halves can be analysed in this way until a sufficient number N of predictions and measurements (e.g. N=10 or N=50) of changes in signature distance between each two subsequent images have been made for the left (N_left>N) and right (N_right>N) image halves. The ratio of the predicted to the measured signature distances is averaged for the left and right image halves (d_meas_left/d_est and d_meas_right/d_est). The estimated roll angle value can then be updated as follows:

If d_meas_left/d_est>d_meas_right/d_est, the roll angle is increased by a correction angle.

If d_meas_left/d_est<d_meas_right/d_est, the roll angle is reduced by a correction angle.

Otherwise, the roll angle is left unchanged.

The correction angle can have a predefined constant value (e.g. 0.05° or 0.1°) that determines the resolution of the roll angle estimation, or the correction angle can have a value that is proportional to the value of (d_meas_left/d_est−d_meas_right/d_est).

The use of the ratio of the measured (d_meas) to the predicted (d_est) signature distance ensures that the consequences of a change in vehicle speed are, taken into account.

REFERENCE NUMERALS

1 Road
2 Left continuous road marking
3 Right continuous road marking
4 Horizontal image centre
5 Vertical image centre
6 Horizon
7 Vehicle
8 Camera
S1-S6 Signatures 1 to 6
d Distance of the signature from the camera in the direction of the vehicle's longitudinal axis in world coordinates
v Vehicle speed

The invention claimed is:

1. A method for estimating the roll angle of a camera in a vehicle traveling on a road surface, by using the camera, comprising the following steps:
   a) the camera is used to record a sequence of camera images of the vehicle's surroundings,
   b) from the camera images, at least one signature on the road surface is determined and tracked,
   c) from a changed position of the at least one signature in at least one subsequent camera image it is determined in which roll angle direction the camera is turned,
   d) a value of the roll angle is
      d1) directly estimated, taking into account the vehicle's speed and an imaging model of the camera or
      d2) estimated and iteratively corrected by a correction angle until a resulting estimated roll angle sufficiently compensates for the turning of the camera.

2. The method according to claim 1, wherein the distance of at least one signature from the camera in the vehicle's longitudinal direction is determined in the step d1), taking into account an imaging model of the camera.

3. The method according to claim 2, wherein the distance of the signature that has been determined and the vehicle's speed are used to predict a predicted distance of the signature after a time interval.

4. The method according to claim 3, wherein a subsequent camera image that has been recorded at the time interval after the first camera image is used to measure a measured distance of the same signature from the camera in the vehicle's longitudinal direction by back-projection.

5. A method according to claim 4, wherein a deviation of the measured distance from the predicted distance is used to estimate the roll angle, taking into account the imaging model of the camera.

6. The method according to claim 1, wherein
   in the step b), at least one first signature (is determined and tracked in a left image half and, in the same or a subsequent camera image, a second signature is determined and tracked in a right image half, and additionally the vehicle's speed at the time each camera image is recorded is stored,
   in the step c), a separate prediction of the signature distance is made for each signature, taking into account the respective vehicle speed and the imaging model of the camera, and the signature distance is measured in a subsequent camera image, and the turning direction of the camera is determined by comparing the deviation of the predicted signature distance from the signature distance that has been measured taking into account the currently estimated roll angle in both image halves, and
   the roll angle is iteratively corrected according to the step d2).

7. The method according to claim 1, wherein
   in the step b), at least one first signature is determined and tracked in a left lower image quadrant and, in the same or a subsequent camera image, a second signature is determined and tracked in the right lower image quadrant, and additionally the vehicle's speed at the time each camera image is recorded is stored,
   in the step c), for each one of the signatures the change of a signature position thereof in the camera image is related as a ratio to the respective vehicle speed and the ratio is compared for both image halves, and it is deduced that the camera is turned in the direction of the image half where this ratio is larger, and
   the roll angle is iteratively corrected according to the step d2).

8. A device for estimating the roll angle of a camera in a travelling vehicle, comprising a camera and an evaluation unit including means for estimating the roll angle according to the method of claim 1.

9. The method according to claim 1, wherein the step d) comprises the step d2).

10. The method according to claim 1, wherein the step d) does not comprise the step d1).

11. The method according to claim 1, wherein the step d2) comprises initially estimating the roll angle as zero at a start of the method.

12. The method according to claim 1, wherein, in the step d2), the estimated roll angle sufficiently compensates for the turning of the camera when the correction angle no longer deviates from zero by more than the angular resolution of the camera.

13. The method according to claim 12, wherein the angular resolution of the camera is less than 0.5E.

14. The method according to claim 12, wherein the angular resolution of the camera is less than 0.1E.

15. The method according to claim 1, wherein the correction angle has a prescribed constant value.

16. The method according to claim 1, wherein in the step b), at least one first signature is determined and tracked in a left image half and, in the same or a subsequent camera image, a second signature is determined and tracked in a right image half, and additionally the vehicle's speed at the time each camera image is recorded is stored,
   in the step c), a separate prediction of the signature distance is made for each signature, taking into account the respective vehicle speed and an imaging model of the camera, and the signature distance is measured in a subsequent camera image, and in the step d2), the correction angle assumes a value that is proportional to a result of a first ratio minus a second ratio, wherein the first ratio is an averaged ratio of the measured signature distances relative to the predicted signature distances for the left image half, and the second ratio is an averaged ratio of the measured signature distances relative to the predicted signature distances for the right image half.

* * * * *

UNITED STATES PATENT AND TRADEMARK OFFICE
CERTIFICATE OF CORRECTION

Page 1 of 1

PATENT NO.        : 8,824,741 B2
APPLICATION NO.   : 13/511733
DATED             : September 2, 2014
INVENTOR(S)       : Michael Walter It is certified that error appears in the above-identified patent and that said Letters Patent is hereby corrected as shown below:

In the Claims:

Column 6,
Line 6, after "signature", delete "(";
Line 55, after "less than", replace "0.5E." by --0.5°.--;
Line 57, after "less than", replace "0.1E." by --0.1°.--.

Signed and Sealed this
Seventh Day of April, 2015

Michelle K. Lee
*Director of the United States Patent and Trademark Office*